Oct. 5, 1965 M. E. KALVERSBERG 3,209,617
AUTOMATIC THREE SPEED GEAR DRIVE FOR VEHICLES
Filed Nov. 14, 1962 2 Sheets-Sheet 1
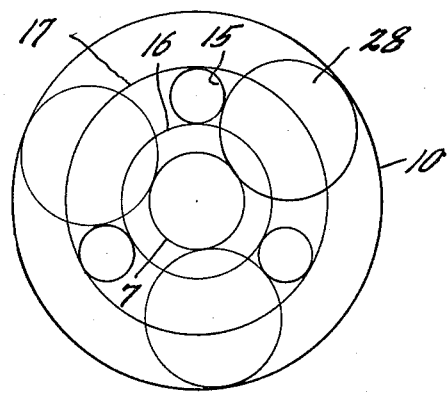
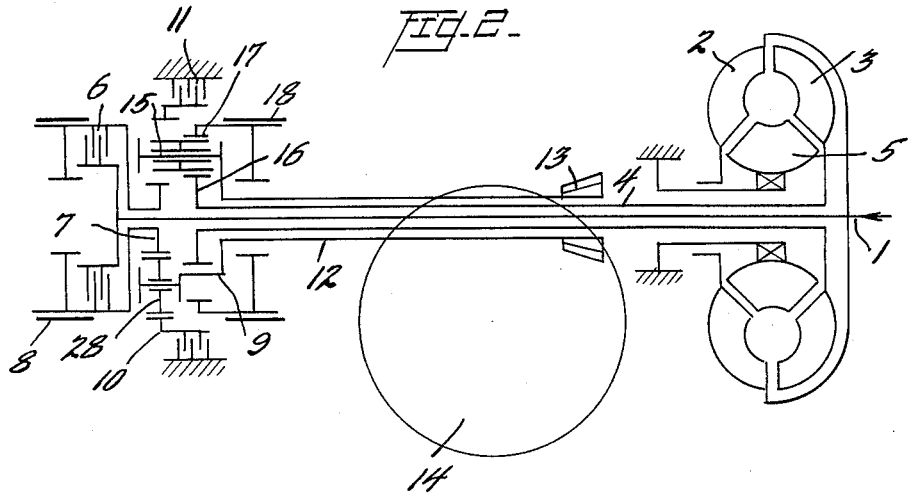
INVENTOR
Manfred E. Kalversberg,
BY
Watson Cole Grindle & Watson
ATTORNEYS

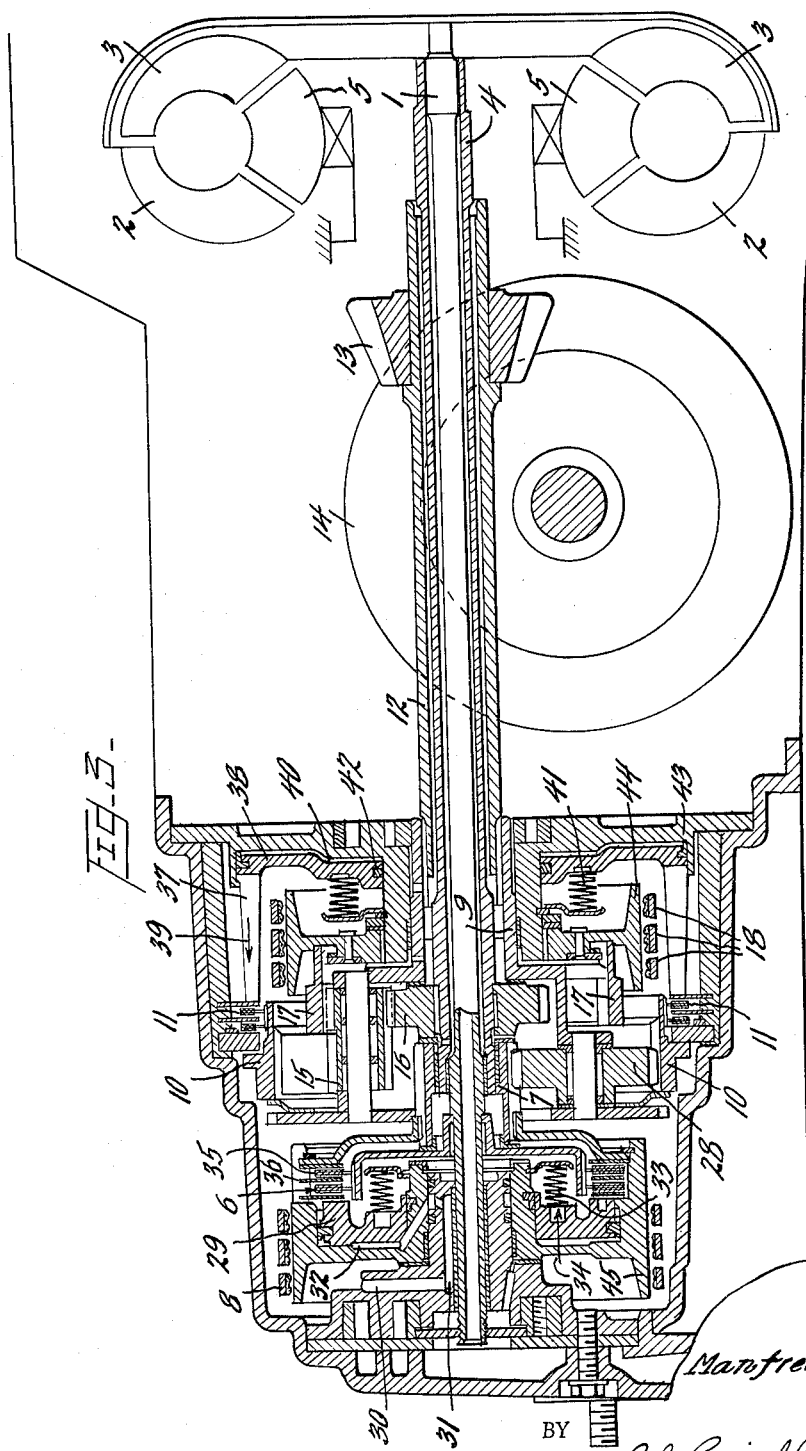

United States Patent Office 3,209,617
Patented Oct. 5, 1965

3,209,617
AUTOMATIC THREE SPEED GEAR DRIVE FOR VEHICLES
Manfred Erich Kalversberg, Stettiner Ring 3, Wolfsburg, Germany
Filed Nov. 14, 1962, Ser. No. 237,642
4 Claims. (Cl. 74—688)

This invention relates to an automatic three-speed gear with reverse and power transmission of the third speed for motor vehicles. More particularly the structure combines a hydraulic converter and a double rotary wheel gear wherein the rotary wheel gear has two sun wheels, two planetary gear groups and two ring wheels.

The gears hitherto known with power transmission are very expensive and it is desired to shorten the length of such automatic gears in order to install them in as narrow a space as possible in a motor vehicle. With a smaller structure costs as also the consumption of energy and the hydraulic parts are less which likewise is very desirable.

It is an object of the invention to provide a three-speed gear in which the third speed has a power transmission. For this purpose according to the invention the following features are provided:

(a) Both differential groups are mounted on a single sun wheel which at the same time forms the driving element,
(b) There are four shifting elements, namely three brakes and a clutch of which for connecting a certain speed only a single one is to be actuated at a time, wherein two brakes serve for braking the ring wheels and one brake for braking one sun wheel while the clutch establishes a separable connection between this sun wheel and the driving shaft,
(c) The second sun wheel is rigidly connected with the turbine of the converter, and
(d) Every two wheels of the two differential groups mesh with one another.

A further object of the invention is to provide the driving shaft coupled directly with the power plant and centrally positioned which serves for the power transmission, capable of being coupled with the small sun wheel of a double rotary wheel gear for obtaining the third speed, while a braking of this sun wheel with idling direct driving shaft gives the second speed. The first speed is cut in by braking the small ring wheel wherein the rotary gear carrier is connected with the driving shaft and the large sun wheel with the turbine. The differential gear is located between the converter and the rotary wheel gear so that between these two gear parts the bevel wheel connected with the driving shaft meshes with the large disc wheel of the differential gear. According to the invention a power transmission in third speed can be obtained in which the power is transmitted ⅔ hydraulically and ⅓ mechanically. For reverse a large ring wheel is braked.

The advantages of the invention consist in a very compact construction of the whole gear, in a power transmission without increased expenditure for shifting elements, and in that each shifting element is used only for one speed whereby a reduced pressure in reverse is obtained and only a small primary pump with slight motive power is necessary.

FIG. 1 shows schematically, a cross section of the gear set of FIGURE 3.

FIG. 2 is a schematic illustration of the transmission of FIGURE 3.

FIG. 3 is a longitudinal section of the transmission according to the present invention.

The driving shaft 1 is centrally mounted in the power plant which serves for the transmission of power for the third speed. The driving shaft 1 is rigidly connected with the pump 2 of the converter, and in a manner known per se, the turbine 3 of the converter is connected with a hollow shaft 4. The impeller 5 of the converter is attached in a manner known. The centrally arranged driving shaft 1 can be connected at its end opposite the converter end to a coupling 6 with the smaller sun wheel 7, and this smaller sun wheel 7 can, on the other hand, be braked and held fast by a brake 8. The sun wheel 7 meshes with the large rotary or planet gears 28 which are mounted on the gear support 9 and in turn mesh with the large ring wheel 10. The large ring wheel 10 is held fast for reverse (backward motion) by a brake 11 whereas the gear support 9 is rigidly connected by means of a drive shaft 12 with the bevel wheel 13 positioned between the converter and the differential gear. This bevel wheel 13 meshes with the large disc wheel 14 of the differential gear. On the gear support there is also mounted a set of small gear wheels 15 which, on the one hand, mesh with the large sun wheel 16 which latter is connected by means of the driving shaft 4 with the turbine 3. On the other hand the gear wheels 15 are engaged with the large gear wheels 28 as well as with a small ring wheel 17, and they can be held fast for cutting or connecting the first speed by the small ring wheel 17 and a brake 18 connected with the latter. The brakes 8 and 18 may be constructed as band brakes with double loops.

The differential gear consists, therefore, of two sun wheels, six planet wheels, two ring wheels and a differential gear support. For the first speed the drive is always effected through the large sun wheel 16 which is positively connected with the turbine 3 of the converter. In the first speed the small ring wheel 17 is supported by means of the first speed brake 18. The drive is effected by means of the differential gear support 9, and as to the second speed the drive is likewise effected by means of the large sun wheel 16 and now the small sun wheel 7 is supported by the second speed brake 8, so that the drive is effected again by means of the differential gear carrier 9. Also as to the third speed the drive takes place first by the large sun wheel 16. Also the small sun wheel 7 is driven which now is coupled by means of the third speed clutch 6 to the centrally positioned driving shaft 1 which in turn is positively connected with the power plant (mechanical power). By the drive of the two sun wheels 7 and 16 (the one hydraulic and the other mechanical) the gear becomes a combined gear and runs as a power transmission. The outputs correspond to the numbers of teeth of the two sun wheels. For reverse the large ring wheel 10 is supported by means of the reverse brake 11. The drive is effected through the large sun wheel 16 and the drive by the differential gear 9.

In the case of the gear according to the invention there is always, therefore only one speed shifting element (brake or clutch) supplied while the other shifting elements are open.

It is also partially apparent as to the actuation of the individual shifting elements. The clutch 6 is actuated by a piston 29 which by means of inlet tubes 30, 31 and 32, is connected with a hydraulic pressure pipe. Thereby the piston is moved against the force of a spring 33 in the direction of the arrow 34 whereby the plates 35 and 36 of the clutch 6 are pressed together so that a connection between the shaft 1 and the sun wheel 16 is established.

In corresponding manner the brake 11 is actuated which likewise is constructed as a plate clutch. The noses 37 of a piston 38 press the plates of the brake 11 together in the direction of the arrow 39. The piston 38 is impinged upon in the space 40 by a hydraulic fluid. The reversal is effected by a spring 41. A rubber packing 42 packs the piston 38 against an inserted lid 32.

The band brakes 8 and 18 are here constructed as double loop band brakes and are actuated likewise by servo-pistons, in a manner not shown. In this case they lie against the brake drums 44 and 45.

I claim:

1. Automatic three-speed gear with reverse gear and power transmission of the third speed, in particular for motor vehicles, comprising a combined hydraulic converter and a double differential gear wherein the differential gear has two sun wheels, a driving shaft, two planet wheel groups and two ring wheels, a single differential gear carrier on which both planet wheel groups are mounted which forms at the same time the driving element, four shifting elements consisting of three brakes and a clutch for connecting in one speed at a time only with a single one is to be actuated wherein two brakes serve for braking the ring wheels and one brake for braking one sun wheel while the clutch establishes a separable connection and the other sun wheel is separably connected by the clutch with the driving shaft, the second sun wheel being rigidly connected with the turbine of the converter, and two wheels of the two differential gear groups meshing with one another.

2. A gear according to claim 1, in which the brake sun wheel is made smaller than the second sun wheel connected with the turbine, the differential gears meshing with the smaller sun wheel being constructed as short planet wheels and the differential gears meshing with the larger sun wheel constructed as long planet wheels which are engaged with the short planet wheels and the ring wheel for the short planet wheels being larger than the ring wheel for the long planet wheels.

3. A gear according to claim 1, in which the brake for the larger ring wheel is constructed as a plate brake and is located between the brakes for the smaller sun wheel constructed as band brakes and the smaller ring wheel.

4. A gear according to claim 1, in which the bevel wheel for the large disc wheel of the differential gear is arranged between the converter and the differential gear.

References Cited by the Examiner
UNITED STATES PATENTS

| | | | |
|---|---|---|---|
| 2,009,477 | 7/35 | Clayton | 74—769 |
| 2,093,236 | 9/37 | Dodge et al. | 74—688 |
| 2,372,817 | 4/45 | Dodge | 74—761 |
| 2,570,327 | 10/51 | Dodge | 74—761 |
| 2,775,144 | 12/56 | Kelbel | 74—769 |
| 2,824,626 | 2/58 | Butterfield | 74—761 |
| 2,889,715 | 6/59 | De Loran | 74—688 |
| 2,929,271 | 3/60 | Miller | 74—761 |
| 2,959,984 | 11/60 | Wickman | 74—688 |
| 3,003,367 | 10/61 | Winchell | 74—688 |
| 3,009,369 | 11/61 | Flinn | 74—761 |
| 3,071,985 | 1/63 | Wickman | 74—761 |

DON A. WAITE, *Primary Examiner.*

BROUGHTON G. DURHAM, *Examiner.*